US010430732B2

(12) United States Patent
Zumwalt et al.

(10) Patent No.: US 10,430,732 B2
(45) Date of Patent: Oct. 1, 2019

(54) PROJECT MANAGEMENT TASK UPDATER

(75) Inventors: Russell Zumwalt, Collingswood, NJ (US); Nicole Dalessio, West Deptford, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 738 days.

(21) Appl. No.: 13/490,927

(22) Filed: Jun. 7, 2012

(65) Prior Publication Data

US 2013/0290053 A1 Oct. 31, 2013

Related U.S. Application Data

(60) Provisional application No. 61/640,135, filed on Apr. 30, 2012.

(51) Int. Cl.
*G06Q 10/06* (2012.01)
*G06Q 10/10* (2012.01)

(52) U.S. Cl.
CPC ....... *G06Q 10/06* (2013.01); *G06Q 10/06311* (2013.01); *G06Q 10/1093* (2013.01)

(58) Field of Classification Search
CPC .................................................. G06Q 10/1093
USPC .............................................. 705/7.11–7.42
See application file for complete search history.

(56) References Cited

U.S. PATENT DOCUMENTS

| | | | |
|---|---|---|---|
| 6,618,730 B1 * | 9/2003 | Poulter et al. ............... 705/7.27 |
| 7,821,874 B2 * | 10/2010 | Liu et al. ........................ 368/10 |
| 8,082,308 B1 * | 12/2011 | Filev .............................. 709/206 |
| 8,121,881 B2 | 2/2012 | Fishman |
| 8,156,050 B2 | 4/2012 | Correll et al. |
| 8,818,993 B2 * | 8/2014 | Boyd ..................... G06Q 10/10 705/7.12 |
| 2004/0243677 A1 * | 12/2004 | Curbow et al. .............. 709/206 |
| 2006/0116918 A1 * | 6/2006 | Flora et al. ...................... 705/8 |
| 2006/0143613 A1 * | 6/2006 | Lippe et al. .................. 718/100 |
| 2008/0244582 A1 * | 10/2008 | Brown et al. ................. 718/100 |
| 2009/0182788 A1 * | 7/2009 | Chung et al. ................. 707/204 |
| 2011/0313803 A1 * | 12/2011 | Friend et al. ................ 705/7.13 |
| 2012/0023393 A1 * | 1/2012 | Tomasic et al. .............. 715/224 |

* cited by examiner

*Primary Examiner* — Richard N Scheunemann
(74) *Attorney, Agent, or Firm* — Potomac Law Group, PLLC (57) ABSTRACT

A system for providing a list of assigned tasks and updating at least one assigned task receives a request for a task list from a user. In response to the request, the system provides a task list to the user, wherein the task list includes at least one assigned task, and the task list allows the user to update the at least one assigned task. The system receives a message including an updated task list from the user. The system then applies updates based upon the updated task list.

19 Claims, 9 Drawing Sheets

Written Action

File  Edit  View  Insert  Format  Options  Tools  Help

☐ Send  ☐ ---- ▾  ⏵ Attach ▾  🔒 Security ▾  ☐ Save ▾

From: ▾
To: 🔒 ─────────── 801
Subject: ──────────

Body Text ▾  Variable width ▾  ☐ A A A A A A ─── 802

Started: 28-Oct-2011
WBS: approvals
Finish: 08-Nov-2011
Status: In Progress
Finished(Y/N): N
Time Spent (----): 1h
Expected Finish: 26-Oct-2011
Remaining Duration: 6d
Time left (----): 6h (Callout): Selecting link generates a new E-mail To address is prepared and body of E-mail contains fields required for sending the task

PROJECT MANAGEMENT TASK UPDATER

CROSS REFERENCE TO RELATED APPLICATIONS

This application claims priority of Provisional Application Ser. No. 61/640,135, filed on Apr. 30, 2012, the contents of which are hereby incorporated by reference.

FIELD

One embodiment is directed generally to a computer system, and in particular to a computer system that updates tasks.

BACKGROUND INFORMATION

A project is an enterprise that may involve a set of tasks that are planned to achieve a particular result. Project management is the discipline of planning, organizing, and coordinating resources to achieve specific goals to bring about the particular result. A project may include a starting date and a completion date that depend upon the complexity and time requirements of the tasks to be completed. Each project task may also have deadlines that are determined and modified based upon the progress of other project tasks. A project may be determined to be finished when the associated tasks are finished.

Project management systems may be computer systems that aid users in initiating, planning, executing, and monitoring various aspects of a project. Some project management systems may operate, for example, by collecting information from project contributors and then updating an overall project plan based upon the collected information. The information may be collected through telephone communication, email communication, or with integrated software applications, for example.

SUMMARY

One embodiment is a system for providing a list of assigned tasks and updating at least one assigned task. The system receives a request for a task list from a user. In response to the request, the system provides a task list to the user, wherein the task list includes at least one assigned task, and the task list allows the user to update the at least one assigned task. The system receives a message including an updated task list from the user. The system then applies updates based upon the updated task list.

DETAILED DESCRIPTION

One embodiment updates tasks for a project management system by allowing a user working on a project to request a list of assigned tasks and to update at least one assigned task. The system may monitor an electronic mail ("email") account for incoming messages from the user, parse the messages, retrieve appropriate data, and reply to the user with the list of assigned tasks. The user may request all or a subset of the assigned tasks.

After the user receives the list of assigned tasks, the user can reply to the message and make updates to each task directly in the message body. When the message (including the updated tasks) reaches the email account, the task update system parses the message body, applies appropriate updates in accordance with the updated tasks, and sends an acknowledgement message to the user.

Project Management has traditionally been a top-down process. A small group of individuals, sometimes one, would coordinate the work of many in order to successfully finish a project. One of the core functions of this group of individuals was to, on a periodic basis, collect status updates from the various project contributors, update a centralized project plan, and assess project progress. The frequency of data collection and the method of collection may vary greatly. The process of collecting status updates may be entirely paper-based, via informal methods like calls or emails, or with integrated software applications. With the spread of personal computers, smart phones, and tablets, using software applications has become an attractive choice and has enabled organizations to decentralize some of their project management processes and to improve data accuracy. However, these software applications may not always be easily adopted because they require an additional tool that must be installed, configured, and learned by the end user. However, email may be an application that many have already installed and know how to use.

When working on large projects, it is common to have a foreman or lead individual coordinate the execution of a work item by a crew or team. This individual may be responsible for ensuring that the work progresses, and for collecting status information from the team. This individual may be responsible for many tasks at one time. Further, this individual may not be situated in an office setting. As such, this individual may need an interface that (1) allows for the management of multiple tasks, and (2) travels easily while the individual is on the go or at remote sites. As an example, an interface through email may serve this purpose.

The known project management systems typically use one of two approaches to leverage email to improve status collection on projects. One approach is to send periodic email notifications to project contributors with a link in the message body to a web-based application for the user to log into and update their assigned task(s). Although this approach alleviates the user from remembering the application's uniform resource locator ("URL"), this approach still requires the user to log into the application directly. A second approach allows updating of one task per message through an application-specific syntax in the subject line of the message. For example, the following subject line in an email would create a task "Visual Designs" on a project named "Design Project," which is due on March 1$^{st}$:

[Design Project] Visual Designs due on March 1

This second approach is simple, and the approach allows a user to rely solely on email messages. However, the subject line of an email message has length limits, which varies by email client. Additionally, specifying multiple updates within the same subject line would add complexity to the syntax. In contrast with these known approaches, one difference between an embodiment of the present task update system when compared to the known project management systems is that the user is able to update many tasks in a single message by editing the message body of the reply, in one embodiment.

Figure 1:
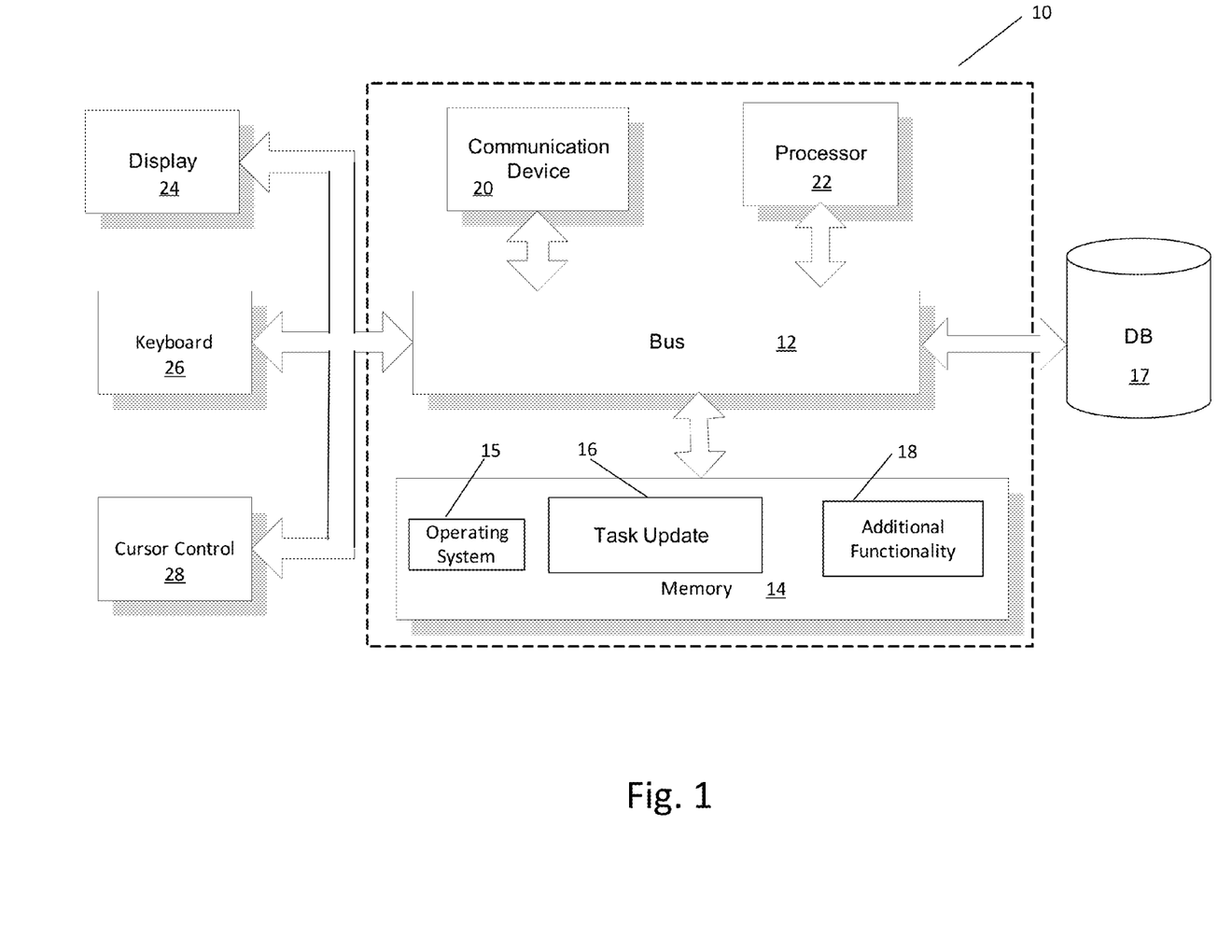
FIG. 1 is a block diagram of a computer server/system in accordance with an embodiment of the present invention.

FIG. 1 is a block diagram of a computer server/system 10 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include a task update module 16 that allows a user working on a project to request and update assigned tasks, as disclosed in more detail below. System 10 can be part of a larger system such as a project management system (e.g., "Primavera" from Oracle Corp.) or an enterprise resource planning ("ERP") system (e.g., "E-Business Suite" from Oracle Corp.). Therefore, system 10 will typically include one or more additional functional modules 18 to include the additional functionality. A database 17 is coupled to bus 12 to store data used with modules 16 and 18.

Figure 2:
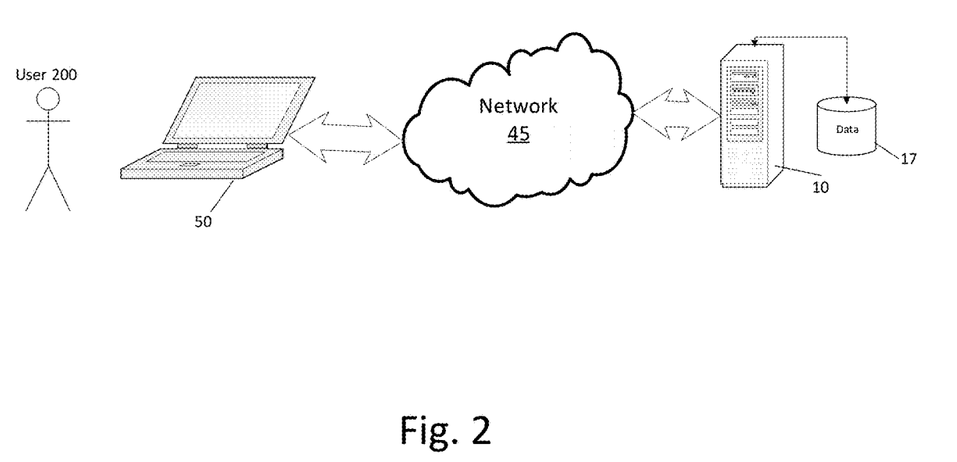
FIG. 2 is an overview block diagram of an example of a task update system in accordance with embodiments of the present invention.

FIG. 2 is an overview block diagram of an example of a task update system in accordance with embodiments of the present invention. In FIG. 2, a user 200 interfaces with server 10 via a communication device 50 and a network 45. Network 45 can by any type of communication network, such as the Internet or an Intranet or other private network. Communication device 50 can be any type of device that allows user 200 to interface with server 10, including a laptop computer, phone, tablet, etc., using a wired or wireless connection, or any other method. Further, in other embodiments, user 200 can interface directly with server 10 (i.e., not via a network) as discussed in conjunction with FIG. 1.

Figure 3:
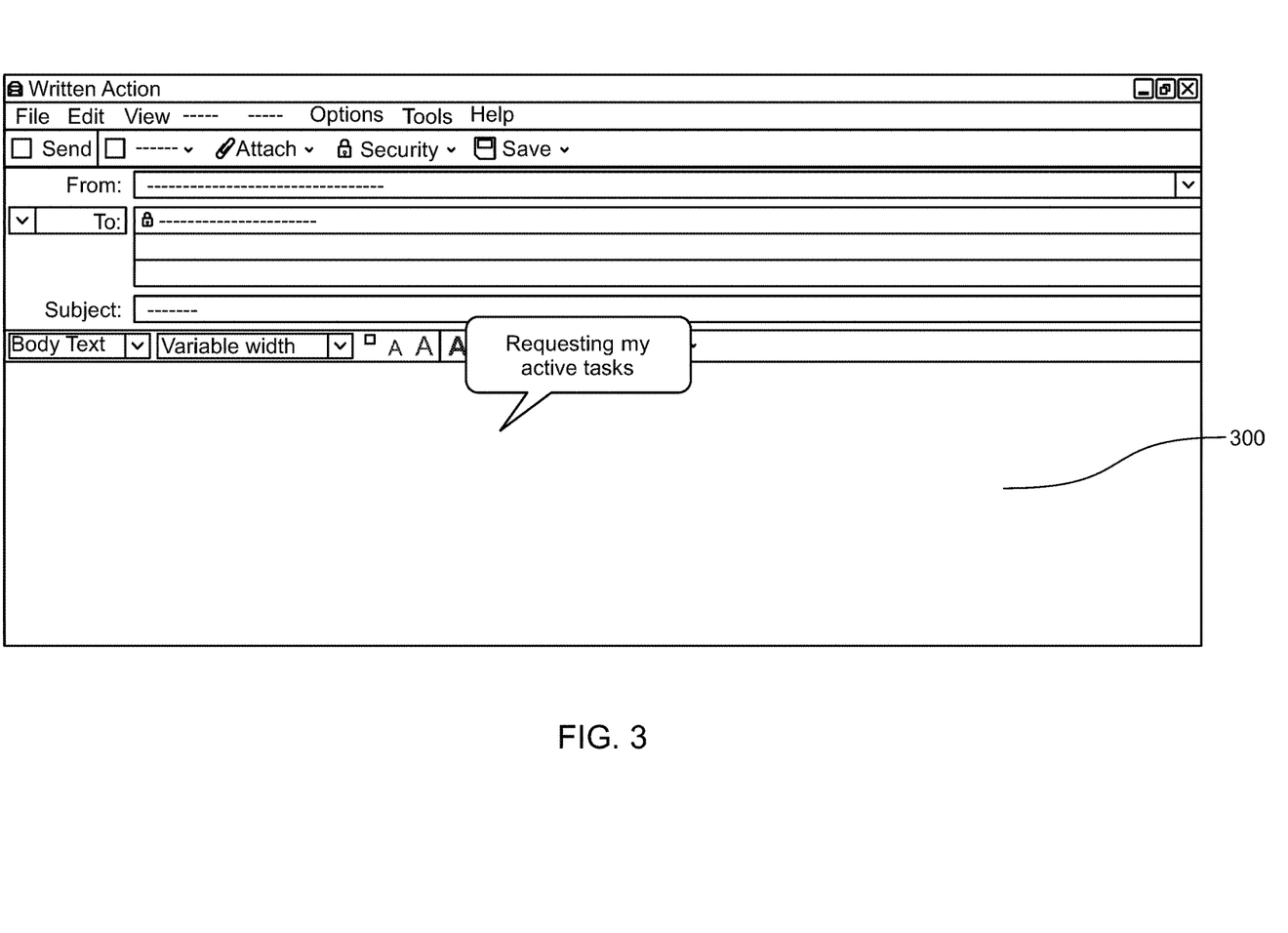
FIG. 3 is a screen shot of a user sending a message that requests a task list in accordance with one embodiment.

FIG. 3 is a screen shot of a user sending a message that requests a task list in accordance with one embodiment. In FIG. 3, a user uses a communication device to send a message 300 requesting a task list to an email account that is configurable per deployment. For example, by indicating "Active" in the subject line of message 300, a user may request a task list of presently active tasks. The task update system may monitor the email account for incoming messages, parse the messages, retrieve appropriate data, and reply to the user with a list of tasks.

In one embodiment, the subject line of message 300 requesting the task list may match a request filter. For example, the subject line may be formatted as:

---

<Status> <Time Period> <Project>
The <Time Period> and <Project> entries may be optional within the subject line. Possible entries for <Status> may include "active," "overdue," "due," "completed," and "starting." Possible entries for <Time Period> may include "Active in next N <time period>," "Active in last N <time period>," "Due in next N <time period>," "Completed in last N <time period>," and "Starting in next N <time period>."

---

Figure 4:
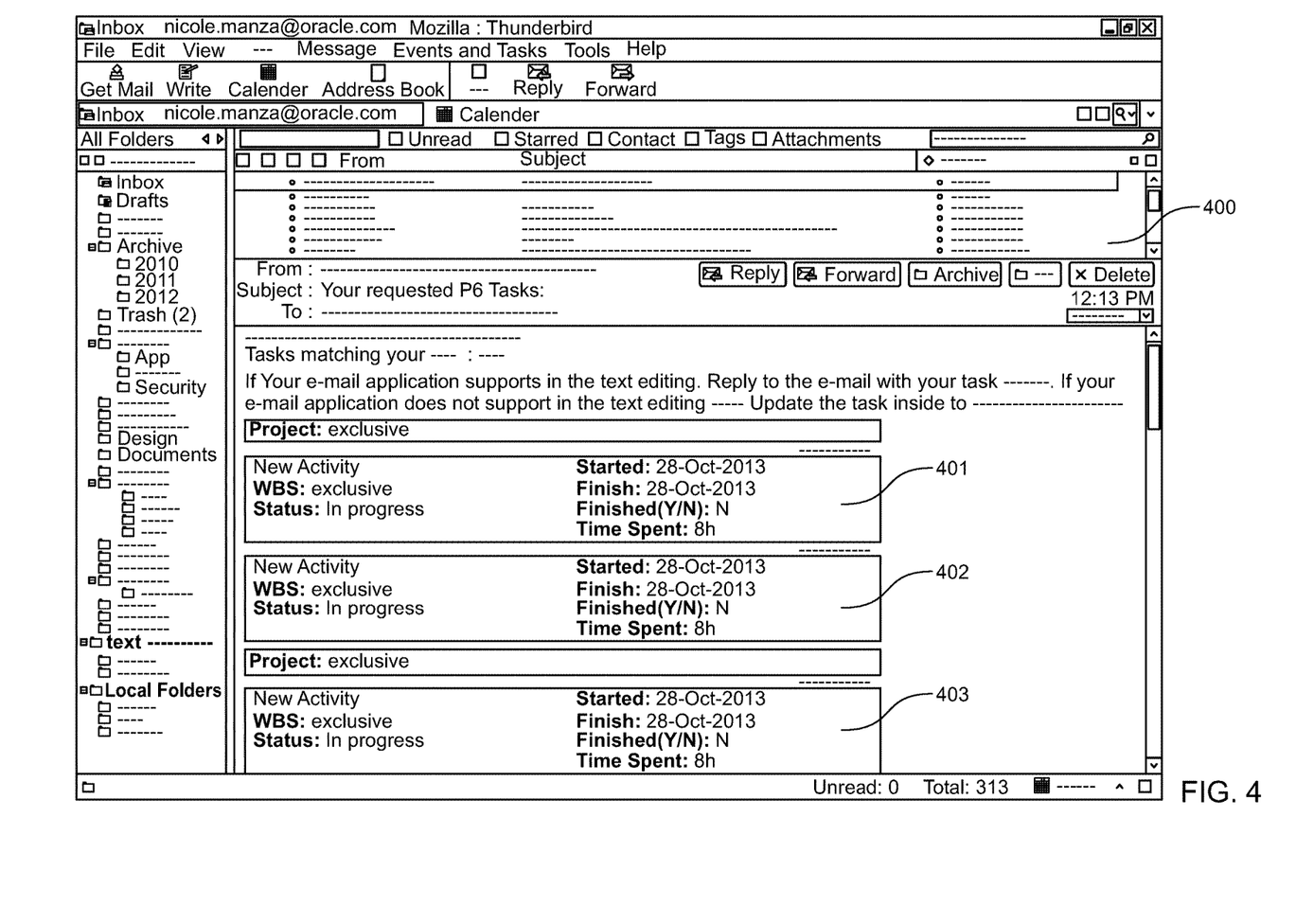
FIG. 4 is a screen shot of a user receiving a list of tasks in accordance with one embodiment.

FIG. 4 is a screen shot of a user receiving a list of tasks in accordance with one embodiment. In FIG. 4, the user may then receive a list of tasks via email 400, such as task 401, task 402, and task 403, for example. The tasks are provided in the body of email 400.

Figure 5:
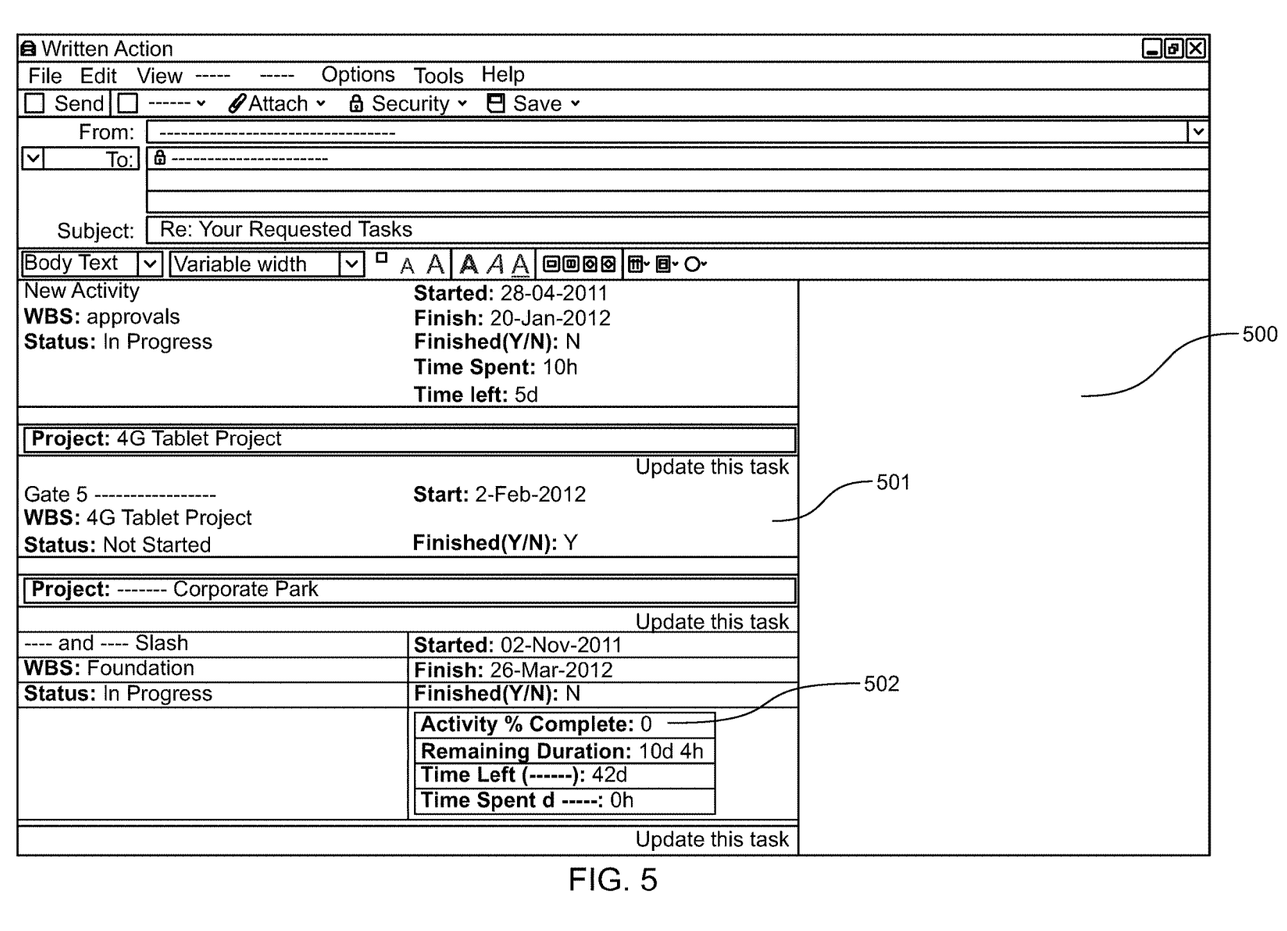
FIG. 5 is a screen shot of a user making updates to tasks directly in a message body in accordance with one embodiment.

FIG. 5 is a screen shot of a user making updates to tasks directly in a message body in accordance with one embodiment. In FIG. 5, the user may then reply to the message and make updates to each task directly in the message body of email 500. The updates to each task may include, but are not limited to, a start date for the task, a finish date for the task, the time spent on a task, the time left on a task, and a status indicating whether or not the task has been finished. For example, in field 501, the user may update a status indicating whether or not the task has been finished from "N" to "Y." In field 502, the user may update an Activity % complete from "0" to "10." As shown in FIG. 5, multiple tasks can be updated inline by replying to the email message.

Figure 6:
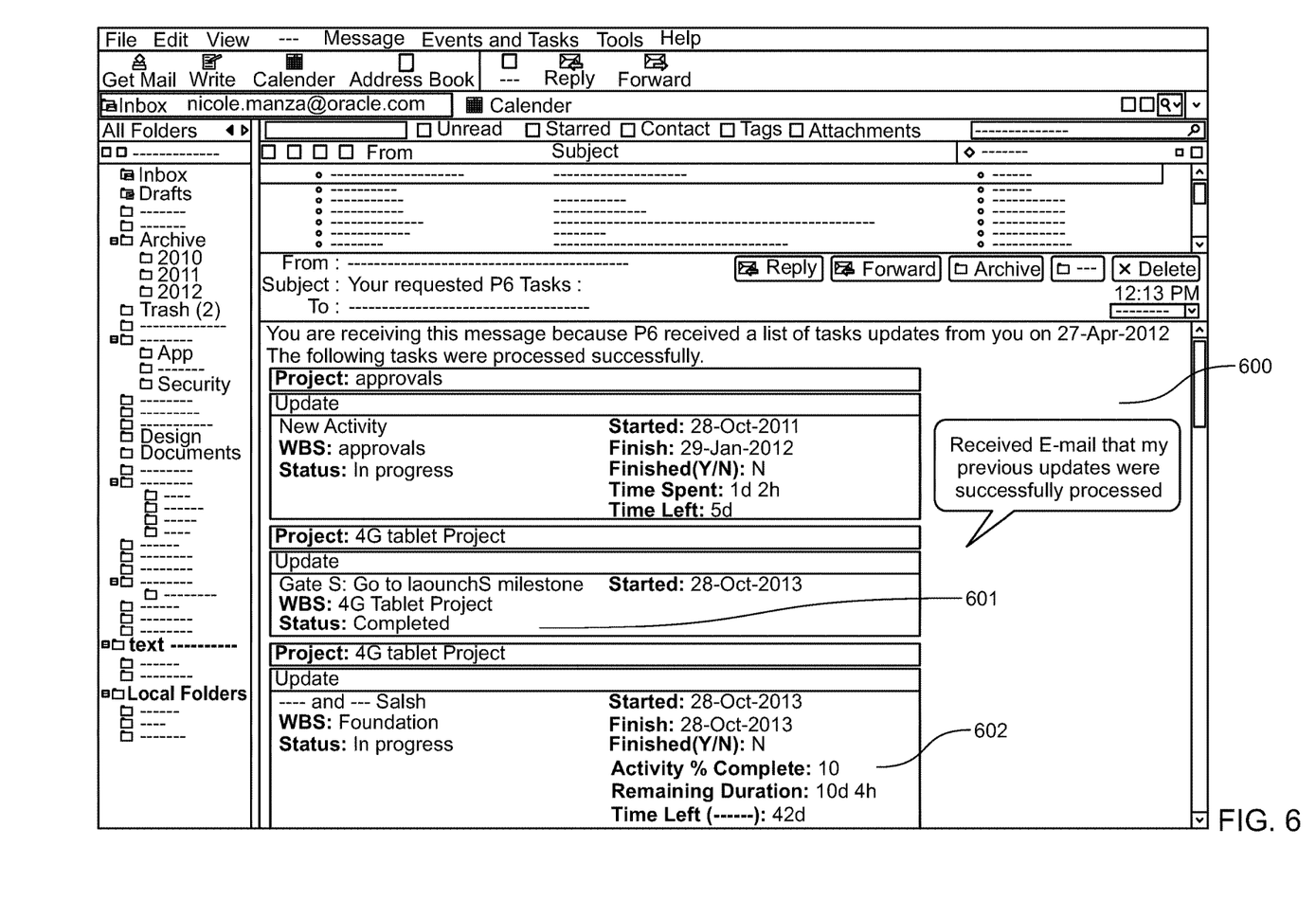
FIG. 6 is a screen shot of a user receiving an acknowledgement message in accordance with one embodiment.

FIG. 6 is a screen shot of a user receiving an acknowledgement message in accordance with one embodiment. In FIG. 6, when the message reply (as shown in FIG. 5) reaches the email account, the task update system parses the message body, applies appropriate updates, and sends an acknowledgement message 600 to the user. Field 601 reflects the updating of the status from "N" to "Y." Field 602 reflects the updating of the Activity % complete from "0" to "10."

In certain embodiments, parsing email message bodies may be more technically challenging than parsing subject lines because different email clients may structure the message content differently, whereas the subject line is typically a simple line of text. Additionally, certain clients may not even support modifying sections of the reply, making it impossible for users to make edits to their tasks without copying/pasting large amounts of text.

Figure 7:
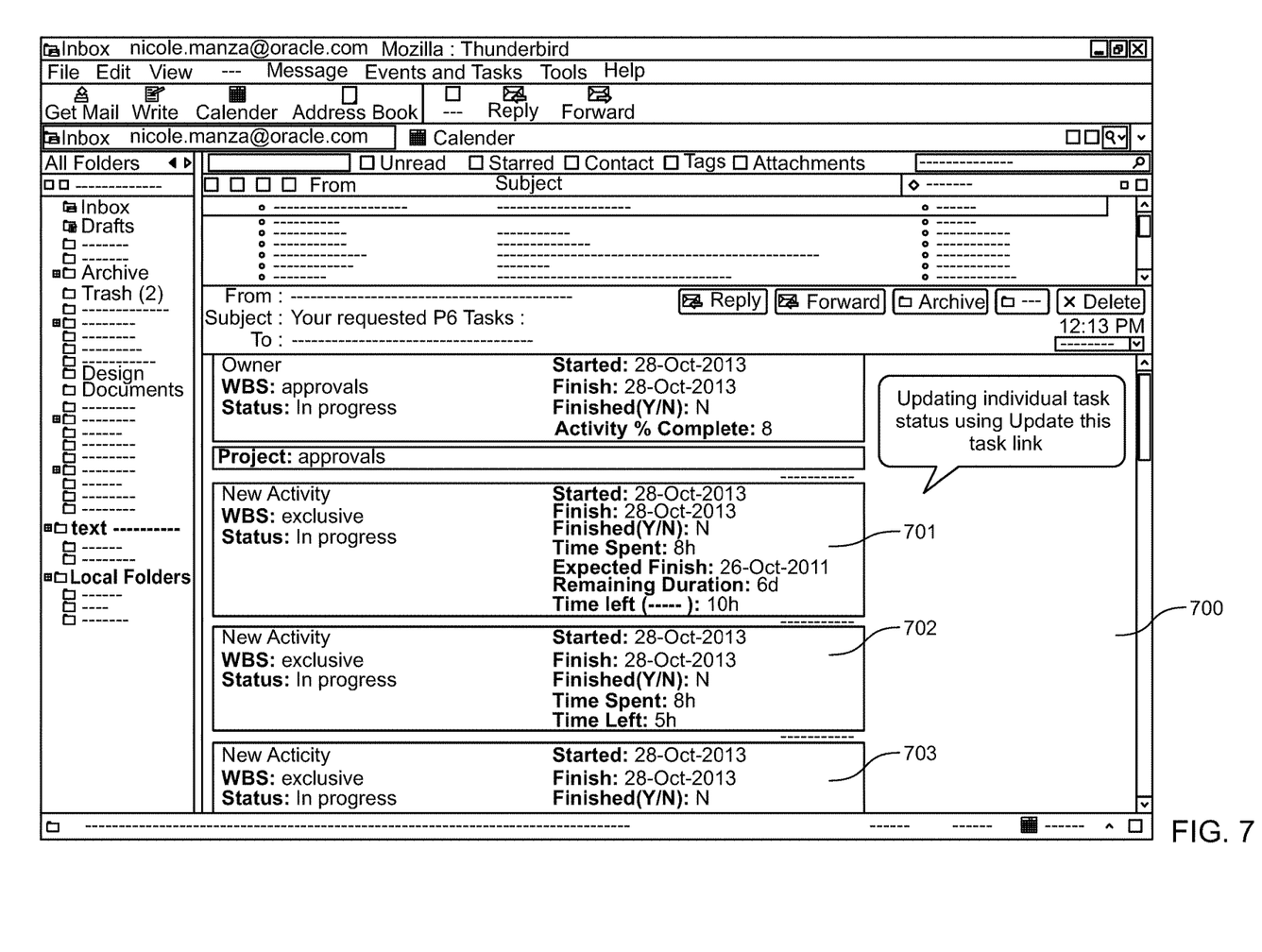
FIG. 7 is a screen shot of a user clicking on a quick edit link in accordance with one embodiment.

In view of the above difficulties, embodiments of the task update system may include a quick edit link associated with the tasks. FIG. 7 is a screen shot of a user clicking on a quick edit link in accordance with one embodiment. In FIG. 7, a user may click on multiple quick edit links 701, 702, and 703, within the body of an email 700.

Figure 8:
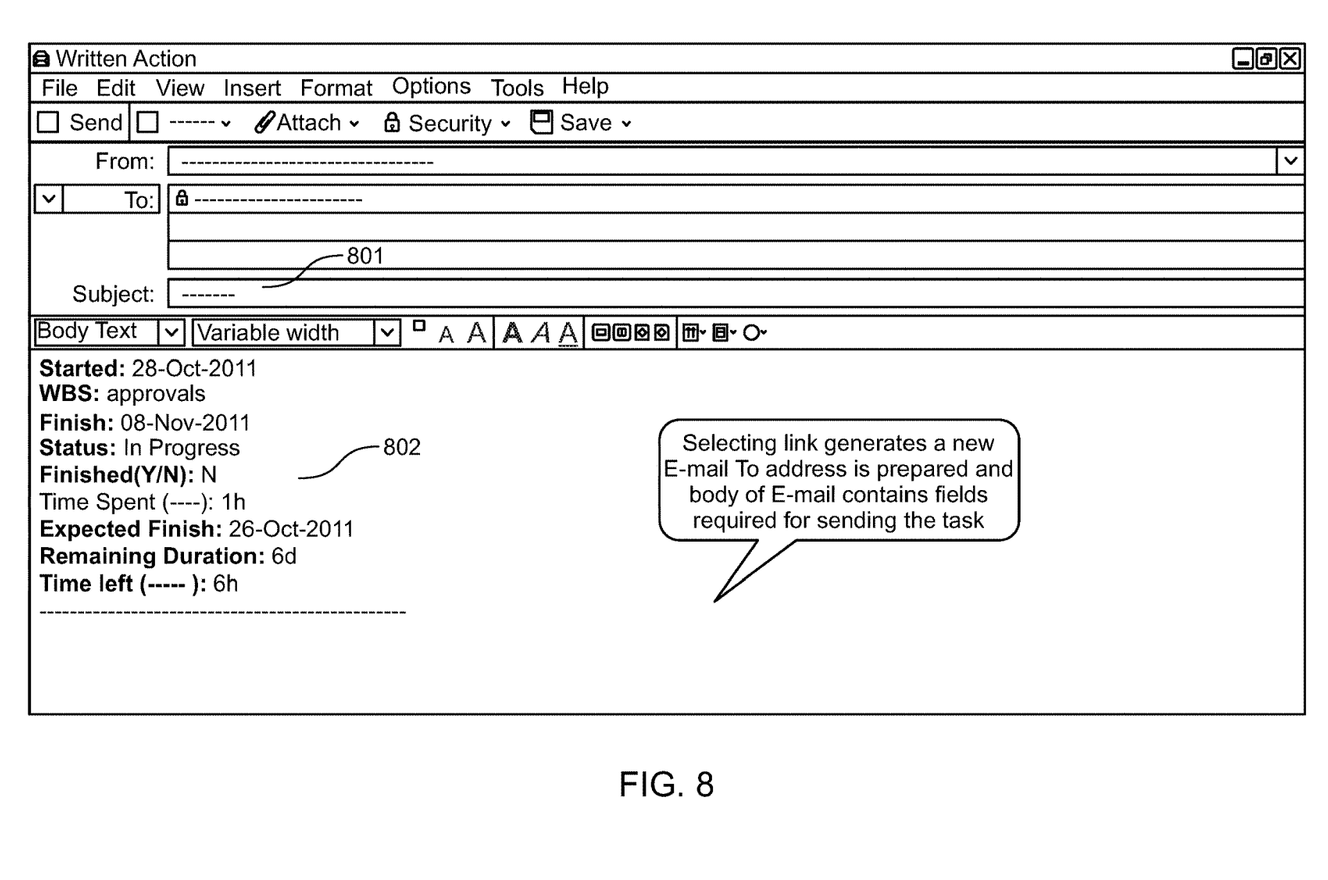
FIG. 8 is a screen shot of a user creating a new message with a quick edit link in accordance with one embodiment.

FIG. 8 is a screen shot of a user creating a new message with a quick edit link in accordance with one embodiment. In FIG. 8, the quick edit link clicked/selected in FIG. 7 creates a new email message with a preformatted subject line 801 and body text 802 that may enable the user to update at least one task in a single message. The quick edit approach provides a work-around for email clients that do not allow inline editing of reply text. This approach may also be an easier option for devices with smaller display areas (like a smart phone) or for users who simply need to update a single task. Further, the body of the new message created by the quick edit link may be automatically populated with the task details. This new message may also have fields that can be modified with new values.

Figure 9:
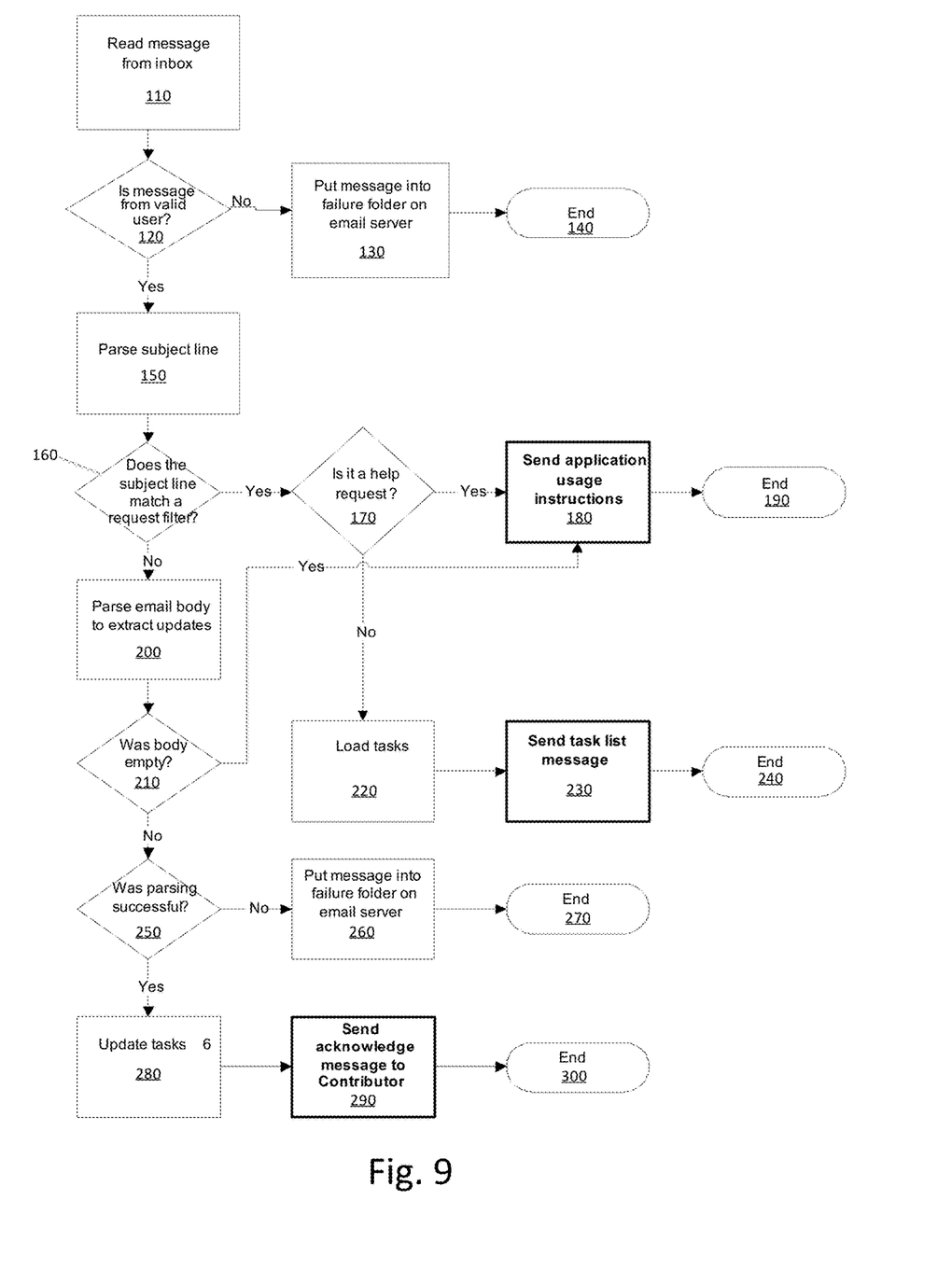
FIG. 9 is a flow diagram of the functionality of the task update module of FIG. 1 when providing and updating tasks in accordance with one embodiment.

FIG. 9 is a flow diagram of the functionality of the task update module of FIG. 1 when providing and updating tasks in accordance with one embodiment. In one embodiment, the functionality of the flow diagram of FIG. 9 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 110, a message is read from an inbox associated with the task update system. As previously described, a user may request and update a list of their assigned tasks by sending an email message (e.g., email message 300 of FIG. 3) to the email account corresponding to the inbox.

At 120, a determination is made regarding whether the message was sent by a valid user. Such a determination may be based upon, but is not limited to, whether the user is using an appropriate project management system, whether the user has access to certain modules of a project management system, whether the email address of the user is assigned to an appropriate resource for performing a given task, and whether an appropriate resource is associated to the user, for example.

If the message is not from a valid user, at 130, the message may be placed within a failure folder on the email server, and processing of the message may end at 140.

If the message is from a valid user, at 150, the subject line of the message is parsed.

At 160, a determination is made regarding whether the subject line of the message matches a recognized request filter. If the subject line of the message does match a recognized request filter, then the message may be: (1) a request for help or (2) a request to receive a task list.

As such, if the subject line of the message does match a request filter, at 170, a determination is made regarding whether the message is a help request.

If the subject line does match a request filter and the message is help request, at 180, a message providing usage instructions is sent to the user.

On the other hand, if the subject line matches a request filter but the message is not a help request, at 220, assigned tasks in accordance with the request filter are retrieved. At 230, these assigned tasks are sent to the user as a task list in the form of an email (e.g., email 400 of FIG. 4).

Returning to 160, if the subject line does not match a request filter, the body of the message is parsed at 200. At 210, a determination is made regarding whether the body of the message is empty.

If the body of message is empty, at 180, a message providing usage instructions is provided to the user. Otherwise, if the body of the message is not empty, at 250, a determination is made regarding whether the message body is parsed successfully.

If the message body is not parsed successfully, at 260, the message is placed into a failure folder.

On the other hand, if the message body is parsed successfully, the message is considered to be a message for making updates to a task list. At 280, the task update system updates the tasks in accordance with the information provided in the body of the message (e.g., update 501 and update 502 of FIG. 5). At 290, the task update system may send an acknowledging receipt (e.g., email 600 of FIG. 6). The acknowledging receipt may acknowledge that the appropriate updates have been performed.

As described above, certain embodiments are directed to a task update system that updates tasks for a project management system by allowing a user working on a project to request a list of assigned tasks and to update at least one assigned task. The system may monitor an electronic mail ("email") account for incoming messages from the user, parse the messages, retrieve appropriate data, and reply to the user with the list of assigned tasks. The user may request all or a subset of the assigned tasks. After the user receives the list of assigned tasks, the user can reply to the message and make updates to each task directly in the message body. When the message (including the updated tasks) reaches the email account, the task update system parses the message body, applies appropriate updates in accordance with the updated tasks, and sends an acknowledgement message to the user. Therefore, multiple tasks can be updated at once in a single email.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to update a project management system, the updating comprising:
    storing project management data for a plurality of projects in a database coupled to a server coupled to a network;
    receiving, at the server, a request for a list of assigned tasks to a user, from a user computer coupled to the network, the request comprising a first email from an email address of the user, a subject line of the first email including an assigned task status, a time period and a time period value, the assigned task status indicating whether a task assigned to the user is active, due, overdue, completed, or starting, and the time period indicating whether the time period value precedes the date of the email for an active, overdue, or completed assigned task status, or succeeds the date of the email for an active, due, or starting assigned task status;
    in response to the request,
        applying a filter to the database to determine the list of assigned tasks to the user based on the assigned task status, the time period and the time period value, each task in the list of assigned tasks being associated with a project,
        creating a second email including the list of assigned tasks to the user, a body of the second email including at least one project section, each project section including a project name and at least one task from the list of assigned tasks, each task including at least one of a start date value, a finish date value, a finished status value or an activity percent completed value, and sending, from the server to the user email address, the second email;

receiving, at the server, a third email from the user email address, a body of the third email including at least one updated project section including at least one updated task, each updated task including at least one updated start date value, finish date value, finished status value or activity percent completed value;

parsing the third email body to retrieve the updated values in each updated task in each updated project section;

applying the updated values from each updated task to each associated project stored in the database;

creating an acknowledgement email based on the updated values applied to each associated project stored in the database, a body of the acknowledgement email including at least one updated project section, each updated project section including the project name and at least one updated task, each updated task including at least one updated start date value, finish date value, finished status value or activity percent completed value; and sending, from the server to the user email address, the acknowledgement email.

2. The computer readable medium of claim 1, wherein the task list provided to the user allows the user to update the finished status value indicating whether or not the at least one assigned task is finished.

3. The computer readable medium of claim 1, wherein the received third email includes the at least one assigned task updated directly in the third email body.

4. The computer readable medium of claim 1, wherein the task list provided to the user includes a quick edit link, and the quick edit link creates a new preformatted email when selected.

5. The computer readable medium of claim 4, wherein the quick edit link allows the user to update one task using the new preformatted email.

6. The computer readable medium of claim 1, wherein the updating further comprises confirming that:

the user is using a predetermined project management system, the user has access to certain modules of the project management system, an email address of the user is assigned to an appropriate resource for performing a particular task, or an appropriate resource is assigned to the user.

7. The computer readable medium of claim 1, wherein determining the list of assigned tasks to the user further comprises determining that the user is a valid user based on a sender email address of the first email.

8. The computer readable medium of claim 1, wherein the subject line of the first email further includes a project name, wherein applying the filter to the database is also based on the project name, and wherein the second email body includes a single project section for the project name.

9. The computer readable medium of claim 1, wherein the updated start data value is provided in a date format, the updated finished date value is provided in a date format, the updated finished status is provided in a Boolean format, and the updated activity percent completed value is provided in an integer format.

10. A computer-implemented method for updating a project management system, the method comprising:

storing project management data for a plurality of projects in a database coupled to a server coupled to a network;

receiving, at the server, a request for a list of assigned tasks to a user, from a user computer coupled to the network, the request comprising a first email from an email address of the user, a subject line of the first email including an assigned task status, a time period and a time period value, the assigned task status indicating whether a task assigned to the user is active, due, overdue, completed, or starting, and the time period indicating whether the time period value precedes the date of the email for an active, overdue, or completed assigned task status, or succeeds the date of the email for an active, due, or starting assigned task status;

in response to the request, applying a filter to the database to determine the list of assigned tasks to the user based on the assigned task status, the time period and the time period value, each task in the list of assigned tasks being associated with a project, creating a second email including the list of assigned tasks to the user, a body of the second email including at least one project section, each project section including a project name and at least one task from the list of assigned tasks, each task including at least one of a start date value, a finish date value, a finished status value or an activity percent completed value, and sending, from the server to the user email address, the second email;

receiving, at the server, a third email from the user email address, a body of the third email including at least one updated project section including at least one updated task, each updated task including at least one updated start date value, finish date value, finished status value or activity percent completed value;

parsing the third email body to retrieve the updated values in each updated task in each updated project section;

applying the updated values from each updated task to each associated project stored in the database;

creating an acknowledgement email based on the updated values applied to each associated project stored in the database, a body of the acknowledgement email including at least one updated project section, each updated project section including the project name and at least one updated task, each updated task including at least one updated start date value, finish date value, finished status value or activity percent completed value; and sending, from the server to the user email address, the acknowledgement email.

11. The method of claim 10, wherein the task list provided to the user allows the user to update the finished status value indicating whether or not the at least one assigned task is finished.

12. The method of claim 10, wherein the received third email includes the at least one assigned task updated directly in the third email body.

13. The method of claim 10, wherein the task list provided to the user includes a quick edit link, and the quick edit link creates a new preformatted email when selected.

14. The method of claim 13, wherein the quick edit link allows the user to update one task using the new preformatted email.

15. A project management system, comprising:

a server, coupled to a network, including:

a processor coupled to a database, and a memory coupled to the processor;

wherein the processor is configured to:

store project management data for a plurality of projects in the database, receive a request for a list of assigned tasks to a user, from a user computer coupled to the network, the request comprising a first email from an email address of the user, a subject line of the first email including an assigned task status, a time period and a time period value, the assigned task status indicating whether a task assigned to the user is active, due, overdue, completed, or starting, and the time period indicating whether the time period value precedes the date of the email for an active, overdue, or completed assigned task status, or succeeds the date of the email for an active, due, or starting assigned task status;

in response to the request,
- apply a filter to the database to determine the list of assigned tasks to the user based on the assigned task status, the time period and the time period value, each task in the list of assigned tasks being associated with a project,
- create a second email including the list of assigned tasks to the user, a body of the second email including at least one project section, each project section including a project name and at least one task from the list of assigned tasks, each task including at least one of a start date value, a finish date value, a finished status value or an activity percent completed value, and
- send, to the user email address, the second email, receive a third email from the user email address, a body of the third email including at least one updated project section including at least one updated task, each updated task including at least one updated start date value, finish date value, finished status value or activity percent completed value, parse the third email body to retrieve the updated values in each updated task in each updated project section, apply the updated values from each updated task to each associated project stored in the database, create an acknowledgement email based on the updated values applied to each associated project stored in the database, a body of the acknowledgement email including at least one updated project section, each updated project section including the project name and at least one updated task, each updated task including at least one updated start date value, finish date value, finished status value or activity percent completed value, and send, to the user email address, the acknowledgement email.

16. The system of claim 15, wherein the task list provided to the user allows the user to update the finished status value indicating whether or not the at least one assigned task is finished.

17. The system of claim 15, wherein the received third email includes the at least one assigned task updated directly in the third email body.

18. The system of claim 15, wherein the task list provided to the user includes a quick edit link, and the quick edit link creates a new preformatted email when selected.

19. The system of claim 18, wherein the quick edit link allows the user to update one task using the new preformatted email.

* * * * *